(12) United States Patent
Yao

(10) Patent No.: US 10,324,315 B2
(45) Date of Patent: Jun. 18, 2019

(54) ELECTRONIC DEVICE

(71) Applicants: Beijing Lenovo Software Ltd., Beijing (CN); Lenovo (Beijing) Limited, Beijing (CN)

(72) Inventor: Hua Yao, Beijing (CN)

(73) Assignees: Beijing Lenovo Software, Ltd., Beijing (CN); Lenovo (Beijing) Limited, Beijing (CN)

( * ) Notice: Subject to any disclaimer, the term of this patent is extended or adjusted under 35 U.S.C. 154(b) by 15 days.

(21) Appl. No.: 14/857,408

(22) Filed: Sep. 17, 2015

(65) Prior Publication Data
US 2016/0377893 A1 Dec. 29, 2016

(30) Foreign Application Priority Data

Jun. 23, 2015 (CN) .......................... 2015 1 0349823

(51) Int. Cl.
*G02B 26/00* (2006.01)
*G02B 26/08* (2006.01)
(Continued)

(52) U.S. Cl.
CPC .......... *G02F 1/0131* (2013.01); *G02F 1/0072* (2013.01); *G06F 1/1616* (2013.01);
(Continued)

(58) Field of Classification Search
CPC .... G02B 2027/0118; G02B 2027/0178; G02B 27/0172; G02B 2027/0105;
(Continued)

(56) References Cited

U.S. PATENT DOCUMENTS

| 2013/0002991 A1* | 1/2013 | Latella ................ H04M 1/0283 349/77 |
| 2013/0271809 A1* | 10/2013 | Gerszberg .......... H05B 33/0857 359/238 |
| 2014/0063049 A1* | 3/2014 | Armstrong-Muntner .................... G03B 9/00 345/619 |

FOREIGN PATENT DOCUMENTS

| CN | 101354596 A | 1/2009 |
| CN | 103677131 A | 3/2014 |

(Continued)

OTHER PUBLICATIONS

"Chinese Application No. 201510349823.X Office Action dated Nov. 29, 2017", w/English Translation, (Nov. 29, 2017), 20 pgs.

*Primary Examiner* — Brandi N Thomas
(74) *Attorney, Agent, or Firm* — Schwegman Lundberg & Woessner, P.A.

(57) ABSTRACT

The present disclosure discloses an electronic device, to solve the technical problem that it is relatively complex to implement a change in color of an appearance of the electronic device in the related art. The electronic device comprises a main body having a basic form and a deformed form; and a color changing film attached to the main body to form a part of a surface of an appearance of the main body, the color changing film being deformed as the main body is changed from the basic form to the deformed form, wherein if the main body is in the basic form, the color changing film as the part of the appearance of the main body presents a first visual effect, and if the main body is in the deformed form, the color changing film as the part of the appearance of the main body presents a second visual effect different from the first visual effect. Based on the same concept, the present disclosure further discloses another electronic device.

9 Claims, 4 Drawing Sheets

(51) Int. Cl.
*G02F 1/29* (2006.01)
*G02F 1/01* (2006.01)
*G02F 1/00* (2006.01)
*G06F 1/16* (2006.01)
*G06F 1/18* (2006.01)

(52) U.S. Cl.
CPC .......... *G06F 1/1626* (2013.01); *G06F 1/1656* (2013.01); *G06F 1/182* (2013.01)

(58) Field of Classification Search
CPC ........ G02B 2027/0174; G02B 26/0833; G02B 26/101; G02B 27/017; G02B 27/283; G02B 27/0176; G02B 5/3083; G02B 6/005; G02B 26/007; G02B 26/026; G02F 1/167; G02F 1/0126; G02F 1/133524; G02F 2201/44; G02F 2202/14; G02F 1/0072; G02F 1/0131; G02F 1/0147
USPC ......... 359/237, 242, 265–267, 290–292, 298
See application file for complete search history.

(56) References Cited

FOREIGN PATENT DOCUMENTS

| | | |
|---|---|---|
| CN | 104698605 A | 6/2015 |
| EP | 2388982 A3 | 12/2013 |
| JP | 2001147739 A | 5/2001 |

\* cited by examiner

| Sub-film 1 | Sub-film 2 | Sub-film 3 |
|---|---|---|

| Red | Orange | Yellow |
|---|---|---|
| Green | Blue | White |

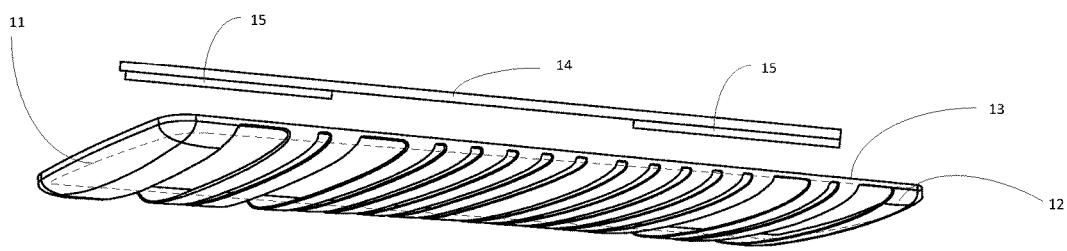
Fig. 3B
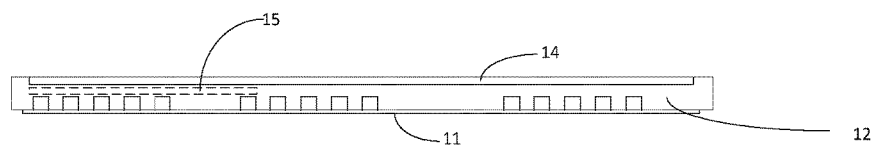
Fig. 4A
Fig. 4B
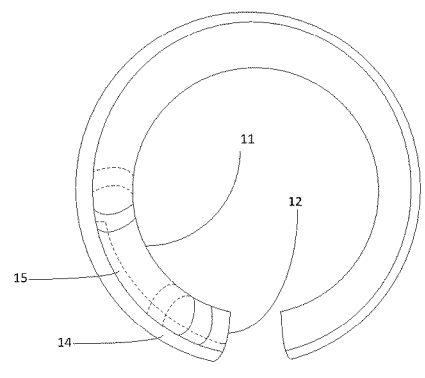
Fig. 4C

ELECTRONIC DEVICE

CROSS-REFERENCE TO RELATED APPLICATION(S)

This application claims priority to the Chinese Patent Application No. 201510349823.X, filed on Jun. 23, 2015, entitled "ELECTRONIC DEVICE" which is incorporated herein by reference in its entirety.

TECHNICAL FIELD

The present disclosure relates to the field of electronic technology, and in particular, to an electronic device.

BACKGROUND

Currently, a color of an appearance of an electronic device primarily depends on a color of material with which a casing thereof is made. For example, a casing of a Notebook Computer (NB) is made of Carbon Fiber (CF) material with a single color, plastic material with a single color, or the like. As a result, a rich change in color cannot be achieved, which results in poor user experience.

In view of this, there is a general solution in the related art that particular material is affixed to the outside of an electronic device, and when a user views at different angles of view, the material presents different colors in accordance with the optical interference principle.

That is, if the user wants to view a change in color of the appearance of the electronic device, the user must change the angle of view, which is inconvenient to achieve.

Thus, it is relatively complex to implement a change in color of the appearance of the electronic device in the related art.

SUMMARY

Embodiments of the present disclosure provide an electronic device, to solve the technical problem in the related art that it is relatively complex to implement a change in color of an appearance of an electronic device in the related art.

In an aspect, the present disclosure provides an electronic device, comprising: a main body having a basic form and a deformed form; and a color changing film attached to the main body to form a part of a surface of an appearance of the main body, the color changing film being deformed as the main body is changed from the basic form to the deformed form, wherein if the main body is in the basic form, the color changing film, as the part of the appearance of the main body, presents a first visual effect, and if the main body is in the deformed form, the color changing film, as the part of the appearance of the main body, presents a second visual effect different from the first visual effect.

Alternatively, the color changing film is deformed as the main body is changed from the basic form to the deformed form, so that the color changing film is converted from the first visual effect to the second visual effect.

Alternatively, the color changing film is a one-piece film; if the main body is in the basic form, the one-piece film as the part of the appearance of the main body has a first color, and the first visual effect is the first color; and if the main body is in the deformed form, the one-piece film as the part of the appearance of the main body has a second color, and the second visual effect is the second color.

Alternatively, the color changing film is comprised of M sub-films, where M is a positive integer greater than or equal to 2; if the main body is in the basic form, each of the M sub-films, as the part of the appearance of the main body, has a first color, at least a first sub-film of the M sub-films has a first color which is different from a first color of a second sub-film, and the first visual effect is comprised of the first color of each of the M sub-films; and if the main body is in the deformed form, each of the M sub-films, as the part of the appearance of the main body, has a second color, at least the first sub-film of the M sub-films has a second color which is different from a second color of the second sub-film, and the second visual effect is comprised of the second color of each of the M sub-films.

Alternatively, the color changing film is comprised of nanocrystals, and in the process of the color changing film being deformed as the main body is changed from the basic form to the deformed form, a spacing between the nanocrystals is changed to achieve a visual effect of a change in color of the color changing film.

Alternatively, the color changing film is a deformable colloid film.

Alternatively, the color changing film has a thickness within [0.1 mm, 0.5 mm].

Alternatively, the main body further comprises: a flexible supporting housing having an accommodating cavity formed therein and having an opening disposed therein; a flexible display screen disposed in the accommodating cavity and having a display output region exposed through the opening; a flexible circuit board disposed in the accommodating cavity and located between the flexible display screen and the flexible supporting housing, wherein the flexible supporting housing, the flexible display screen and the flexible circuit board flexibly are deformed together under the action of an external force; wherein the part of the surface of the appearance which is formed by attaching the color changing film to the main body is the whole appearance of the flexible supporting housing, or the part of the surface of the appearance which is formed by attaching the color changing film to the main body is the flexible supporting housing, and the flexible supporting housing is made of the color changing film.

Alternatively, the main body further comprises: a first portion; a second portion; a connecting member, wherein the first portion is connected to the second portion through the connecting member, and a form conversion of the first portion and the second portion is achieved through the connecting member; wherein the part of the surface of the appearance which is formed by attaching the color changing film to the main body is the connecting member which covers the main body.

Alternatively, the main body further comprises: a first housing layer; a frame component arrangement layer; and a second housing layer, wherein the frame component arrangement layer is encapsulated by the first housing layer and the second housing layer and is located in an interior encapsulation space formed by the first housing layer and the second housing layer; wherein the frame component arrangement layer comprises: a first frame; a rotational connecting member; and a second frame rotationally connected to the first frame through the rotational connecting member; wherein a form deformation of the first frame and the second frame is achieved through the rotational connecting member under the action of an external force.

In another aspect, based on the same concept, the present disclosure further provides an electronic device, which specifically comprises: a main body; a color changing film attached to the main body to form a surface of an appearance of the main body, the color changing film having a basic form and a deformed form; and a stretching apparatus configured to actuate a change from the basic form to the deformed form; wherein if the color changing film as the appearance of the main body is in the basic form, the color changing film presents a first visual effect, and if the color changing film, as the appearance of the main body, is in the deformed form, the color changing film presents a second visual effect different from the first visual effect.

The above one or more technical solutions according to the embodiments of the present disclosure at least have the following one or more technical effects and advantages.

In the embodiments of the present disclosure, the technical measure of attaching the color changing film to a part of an external surface of the main body is used, so that when the main body is in a different form, the color changing film may deform therewith, so as to present a different visual effect, which largely improves the user experience.

In the embodiments of the present disclosure, when the main body is in different forms, the color changing film may have different colors. Therefore, the user can determine the state of the electronic device only through the color of the color changing film, which can effectively prompt the user of the current operation state of the electronic device while improving the visual experience of the electronic device.

BRIEF DESCRIPTION OF THE DRAWINGS

In order to illustrate technical solutions in the embodiments of the present disclosure or in the related art more clearly, accompanying drawings needed to be used in the description of the embodiments or the related art will be described below in brief. Obviously, the accompanying drawings described below are merely some embodiments of the present disclosure. A person having ordinary skill in the art can further acquire other accompanying drawings according to these accompanying drawing without contributing any creative labor.

FIG. 1 is a structural block diagram of an electronic device according to an embodiment of the present disclosure;

FIG. 2 is a structural block diagram of a color changing film according to an embodiment of the present disclosure;

FIGS. 3A and 3B are diagrams of a color changing film according to an embodiment of the present disclosure;

FIGS. 4A-4C are diagrams of a first electronic device according to an embodiment of the present disclosure;

DETAILED DESCRIPTION

Figures 1, 2, 3A:
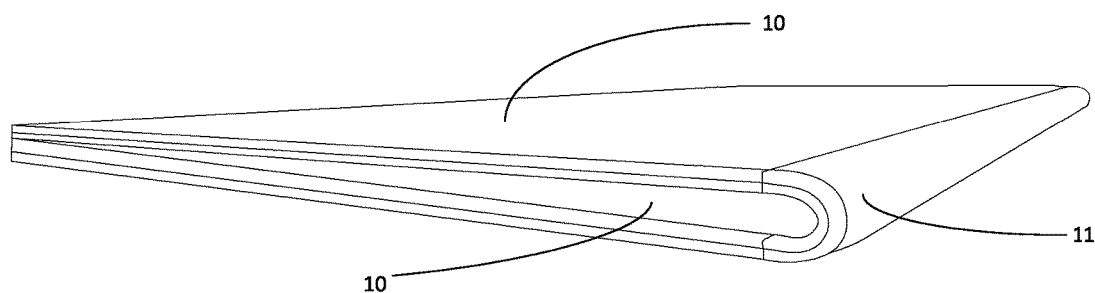

The embodiments of the present disclosure provide an electronic device, which specifically comprises a main body having a basic form and a deformed form; and a color changing film attached to the main body to form a part of a surface of an appearance of the main body, the color changing film being deformed as the main body is changed from the basic form to the deformed form, wherein if the main body is in the basic form, the color changing film as the part of the appearance of the main body presents a first visual effect, and if the main body is in the deformed form, the color changing film as the part of the appearance of the main body presents a second visual effect different from the first visual effect.

In the embodiments of the present disclosure, the technical measure of attaching the color changing film to a part of an external surface of the main body is used, so that when the main body is in a different form, the color changing film may deform therewith, so as to present a different visual effect, which largely improves the user experience.

In the embodiments of the present disclosure, if the main body is in different forms, the color changing film may have different colors. Therefore, the user can determine the state of the electronic device only through the color of the color changing film, which can effectively prompt the user of the current operation state of the electronic device while improving the visual experience of the electronic device.

In order to make the purposes, technical solutions, and advantages of the present disclosure more clear and obvious, the technical solutions in the embodiments of the present disclosure will be clearly and completely described below with reference to the drawings of the embodiments of the present disclosure. Obviously, the embodiments as described are merely a part of the embodiments of the present disclosure instead of all of the embodiments. All other embodiments obtained by those skilled in the art based on the embodiments of the present disclosure without any creative effort should belong to the scope protected by the present disclosure. Without a conflict, embodiments in the present disclosure and features in the embodiments may be combined randomly with each other. Steps illustrated in flowcharts in the drawings may be performed when for example a three-dimensional image of a building is described. Further, although a logical order is illustrated in the flowcharts, in some cases, the steps illustrated or described may be performed in an order different from the order illustrated here.

Further, the term "and/or" herein is merely an association relationship for describing associated objects, and represents that there may be three relationships. For example, A and/or B may represent three cases, i.e., only A, both A and B, or only B. In addition, a character "/" herein generally represents there is a "or" relationship between two associated objects prior to and behind the character "/".

The preferable implementations of the present disclosure will be described in detail below in conjunction with accompanying drawings.

As shown in FIG. 1, an electronic device according to an embodiment of the present disclosure comprises:

a main body 10 comprising a basic form and a deformed form; and a color changing film 11 attached to the main body 10 to form a part of a surface of an appearance of the main body 10, the color changing film 11 being deformed with the main body 10 being changed from the basic form to the deformed form, wherein, if the main body 10 is in the basic form, the color changing film 11 as the part of the appearance of the main body 10 presents a first visual effect; and if the main body 10 is in the deformed form, the color changing film 11 as the part of the appearance of the main body 10 presents a second visual effect different from the first visual effect.

In the embodiment of the present disclosure, the main body 10 may be a flexible supporting housing of an electronic device having a flexible display screen, for example, a flexible housing on a back side of a mobile phone having a flexible screen. Alternatively, the main body 10 may also be a band for wearing an electronic device such as an smart wrist-mounted device, for example, a watchband of an smart watch, or a fixing band of an smart wristband. The main body 10 may also be a notebook computer, or a clamshell phone or the like, which is not limited in the present disclosure.

In the embodiment of the present disclosure, the basic form may be an appearance form of the electronic device when the electronic device is in a standby mode, and the corresponding deformed form may be a form of the electronic device when the electronic device is in an operation mode. Alternatively, the basic form may be an appearance form of the electronic device in a first operation mode, and the corresponding deformed form may be an appearance form of the electronic device in a second operation mode, or the like, which is not limited in the present disclosure.

For example, by taking the electronic device being a notebook computer as an example, the basic form may be a form when the notebook computer is not in use, for example, a form when the notebook computer is closed, and the corresponding deformed form may be a form when the notebook computer is in operation, for example, a form when the notebook computer is opened at a certain angle.

Alternatively, by taking a flexible smart mobile phone as an example, the basic form may be a form when the flexible mobile phone is not bent to deform, for example, an appearance form when the mobile phone is in an operation mode of a mobile phone, and the corresponding deformed form may be a form after the mobile phone is bent, for example, an appearance form when the mobile phone is bent to have a ring shape and the mobile phone is in an operation mode of an smart wristband.

Of course, those skilled in the art can obtain other embodiments within the protection scope of the present disclosure according to the above examples without contributing any creative effort, which will not be described in detail in the present disclosure.

In the embodiment of the present disclosure, the color changing film 11 may be used as the whole appearance of the main body 10. For example, the whole appearance of the flexible supporting housing of the flexible electronic device is set as the color changing film 11. Of course, in order to fix the color changing film 11 to the whole appearance of the flexible supporting housing, those skilled in the art may fix a perimeter of the color changing film 11 to the whole appearance of the flexible supporting housing in an affixing manner or another fixing manner, and remaining parts of the color changing film 11 may cover the whole appearance of the flexible supporting housing. When the flexible supporting housing is deformed, the whole color changing film correspondingly is deformed therewith, and a spacing between particles in the color changing film 11 change as the color changing film 11 is deformed. For example, when a spacing between particles is 2 nanometers, the color changing film 11 has a color of red, and when a spacing between particles is 3 nanometers, the color changing film 11 has a color of blue.

In the embodiment of the present disclosure, the color changing film 11 may be used as a part of the appearance of the main body 10, for example, an appearance of a rotational connecting member of a notebook computer. That is, the color changing film 11 may be attached to the appearance of the rotational connecting member. Of course, the attachment manner may be the same as that in the above example, or there may be another attachment manner, which is not limited in the present disclosure. When the color changing film 11 is deformed, for example, the notebook computer is controlled by opening at a certain angle to enter an operation state from an unused state, the color changing film 11 may deform with the rotational connecting member, and a spacing between particles in the color changing film 11 may also change correspondingly, so that a color of the color changing film 11 changes. The specific implementation thereof is the same as that in the above example, which will not be described in detail here.

In the embodiment of the present disclosure, a visual effect is a color effect of the color changing film. The visual effect may be single, for example, a single color, or may be diverse, for example, diverse colors or the like, which is not limited in the present disclosure.

Alternatively, in the embodiment of the present disclosure, the color changing film 11 is deformed with the main body 10 is changed from a basic form to a deformed form, so that the color changing film 11 is converted from a first visual effect to a second visual effect.

In the embodiment of the present disclosure, as the perimeter of the color changing film 11 is fixed to a region where the main body 10 is deformed, when the main body is deformed, the color changing film 11 may be subjected to an external stretching force or an external compressive force. Under the action of the external force, a spacing between a part of particles in the color changing film 11 may change therewith, which finally results in a change in color of the color changing film, thereby enhancing the visual effect of the electronic device.

Alternatively, in the embodiment of the present disclosure, the color changing film 11 is a one-piece film;

if the main body 10 is in the basic form, the one-piece film as the part of the appearance of the main body 10 has a first color, and the first visual effect is the first color; and if the main body 10 is in the deformed form, the one-piece film as the part of the appearance of the main body 10 has a second color, and the second visual effect is the second color.

In the embodiment of the present disclosure, the color changing film 11 may be a one-piece film, i.e. a whole piece of film, rather than lamination or combination of multiple films. An advantage of using the one-piece film is that when the color changing film 11 is deformed with the main body 10, as the one-piece film has a relatively homogeneous overall construction and particles are disposed in alignment, when the color changing film is correspondingly deformed, a spacing between particles in the color changing film change in a relatively consistent manner, i.e., colors presented by the color changing film 11 are also more uniform. Further, as the manufacturing process of the one-piece film is relatively simple, in the process of producing and manufacturing a product, certain time which is spent on manufacturing may be saved, and some manufacturing steps may be omitted, which effectively improve the production efficiency of the product.

Alternatively, in the embodiment of the present disclosure, the color changing film 11 is comprised of M sub-films, where M is a positive integer greater than or equal to 2;

if the main body 10 is in the basic form, each of the M sub-films, as the part of the appearance of the main body 10, has a first color, at least a first sub-film of the M sub-films has a first color which is different from a first color of a second sub-film of the M sub-films, and the first visual effect is comprised of the first color of each of the M sub-films; and if the main body 10 is in the deformed form, each of the M sub-films, as the part of the appearance of the main body 10, has a second color, at least the first sub-film of the M sub-films has a second color which is different from a second color of the second sub-film of the M sub-films, and the second visual effect is comprised of the second color of each of the M sub-films.

In the embodiment of the present disclosure, the color changing film 11 may also be comprised of multiple sub-films. As shown in FIG. 2, the color changing film is formed by "tiling" multiple sub-films. Of course, "tiling" here may refer to combining multiple different sub-films in accordance with respective perimeters thereof, to commonly control deformation of the multiple sub-films, or individually control deformation of several of the multiple sub-films. Further, all of the sub-films may have different shapes. For example, a sub-film may be designed to have a rectangular shape, a sub-film may be designed to have a square shape, or the like, which is not limited in the present disclosure.

In the present embodiment of the present disclosure, in order to achieve richer visual experience, as shown in FIGS. 3A and 3B, various sub-films may be set to have different colors, which are red, orange, yellow, green, blue, and white in an order from left to right and from up to down. When the main body 10 is deformed, various sub-films have the same degree of deformation. As various sub-films have different initial colors, when the main body 10 is adjusted from the basic form to the deformed form, various sub-films may not be the same. In this case, the 6 sub-films have colors of yellow, blue, green, white, red, and orange in an order from left to right and from up to down. Obviously, before the main body is deformed, the color changing film 11 comprised of 6 sub-films is colorful. After the main body 10 is deformed, although a color of each sub-film changes, the color changing film 11 is also colorful. Thereby, the main body has a richer visual effect, and thus can satisfy usage requirements of users.

In the present embodiment of the present disclosure, various sub-films may also be configured with the same initial color. That is, if the main body 10 is in a basic form, various sub-films are set to have a color of red. If the main body is deformed, various sub-films have the same degree of deformation. Therefore, If the main body 10 is in the deformed form, various sub-films have a color of blue. As the principle thereof is similar to that of the one-piece film, the description thereof will not be described in detail here. Of course, various sub-films may be set to have required colors by those skilled in the art by experience, which is also not limited in the present disclosure.

Alternatively, in the present embodiment of the present disclosure, the color changing film 11 is comprised of nanocrystals;

in the process of the color changing film being deformed as the main body 10 is changed from the basic form to the deformed form, a spacing between the nanocrystals in the color changing film change to achieve a visual effect of a change in color of the color changing film 11.

In the present embodiment of the present disclosure, the color changing film 11 is a nanocrystal film. When the film is subjected to an action such as stretching or extrusion which may actuate the film to deform, nanocrystals in the film are stretched or extruded therewith, and a spacing between the nanocrystals may decrease or increase. When the spacing decreases, the nanocrystals may mostly reflect or refract light close to a blue spectrum, while when the spacing increases, the nanocrystals may mostly reflect or refract light close to a red spectrum, which results in different colors being presented by the color changing film 11.

Alternatively, in the present embodiment of the present disclosure, the color changing film 11 may be a deformable colloid film.

In the present embodiment of the present disclosure, the color changing film 11 is an elastic deformable colloid film. Elasticity of the colloid film may be set to a suitable value by those skilled in the art by experience to ensure that the color changing film 11 can be used many times, thereby effectively improving the usage life of the whole electronic device.

Alternatively, in the present embodiment of the present disclosure, the color changing film 11 has a thickness within [0.1 mm, 0.5 mm].

In the present embodiment of the present disclosure, a value of the thickness of the color changing film 11 is merely a predetermined value which achieves a better effect. When the thickness is within the thickness range, the color changing film 11 can present a better visual effect. Further, the thickness range will not influence the hand feeling of the user. Of course, the thickness of the color changing film 11 may be adjusted to another value by those skilled in the art according to practical usage conditions, which is not limited in the present disclosure.

Alternatively, as shown in FIG. 4A, in the embodiment of the present disclosure, the main body 10 further comprises:

a flexible supporting housing 12 having an accommodating cavity 13 formed therein and having an opening disposed therein;

a flexible display screen 14 disposed in the accommodating cavity 13 and having a display output region exposed through the opening;

a flexible circuit board 15 disposed in the accommodating cavity 13 and located between the flexible display screen 14 and the flexible supporting housing 12, wherein the flexible supporting housing 12, the flexible display screen 14 and the flexible circuit board 15 flexibly deform together under the action of an external force;

wherein the part of the surface of the appearance which is formed by attaching the color changing film 11 to the main body 10 is the whole appearance of the flexible supporting housing 12, or the part of the surface of the appearance which is formed by attaching the color changing film 11 to the main body 10 is the flexible supporting housing 12, and the flexible supporting housing 12 is made of the color changing film 11.

In the embodiment of the present disclosure, the flexible supporting housing 12 may be made of flexible glass material, flexible metal material, or flexible carbon fiber material, or the like. Alternatively, the color changing film 11 may be directly made into the flexible supporting housing 12, which is not limited in the present disclosure.

In the embodiment of the present disclosure, the flexible supporting housing 12 may have multiple stiffeners disposed therein, and there are gaps remaining between the stiffeners. Such design has an effect that when the flexible electronic device is not acted by an external force, the flexible electronic device may be maintained in a plate form, and when the flexible electronic device is bent, the stiffeners may further provide a certain amount of supporting force, to maintain a flexible form of the flexible electronic device. Further, as some gaps are reserved between various stiffeners, an angle at which the flexible supporting housing 12 may be bent is increased, thereby ensuring better scalability of the whole flexible electronic device.

In the embodiment of the present disclosure, when the flexible display screen 14 is bent to deform, the display performance of the flexible display screen 14 is not influenced by the deformation of the appearance thereof. Further, the flexible display screen 14 further has a function of implementing multi-screen display according to a degree of bending thereof. For example, when the flexible display screen 14 is bent at an angle greater than 90 degrees, the flexible display screen 14 may be divided into several sub-display screens according to perimeters which are formed after the screen is bent. These sub-display screens may display content independently, or may commonly display the same display content, which is not limited in the present disclosure.

In the embodiment of the present disclosure, the flexible circuit board 15 has a primary function of controlling the display content on the flexible display screen 14, responding to a user's operation or the like. The flexible circuit board 15 may deform under the action of an external force together with the flexible supporting housing 12 and the flexible display screen 14. Further, in order to ensure the function of the flexible circuit board 15 is not influenced after it is deformed, a flexibility process may be implemented on the flexible circuit board 15 by those skilled in the art according to practical conditions. The specific process thereof is also not described in detail in the present disclosure.

In the embodiment of the present disclosure, the main body 10 at least has two forms. The main body 10 may be in a basic form, which is a "plate" form. In this case, as shown in FIG. 4B, the main body 10 is an smart mobile phone having a flexible screen, and may implement related functions of the smart mobile phone. Further, due to the existence of the stiffeners, the main body 10 is maintained in a plate form when the main body 10 is not acted by an external force. In addition, as shown in FIG. 4C, the main body 10 may also be in a deformed form, for example, the main body 10 is bent to have a wristband shape. In this case, the main body 10 is an smart wristband having a flexible screen. The display screen in the original plate form is a display screen of the smart wristband. When the electronic device is in this form, related functions of the smart wristband may be implemented. Of course, the main body 10 may be bent to form an smart wristband in many manners. For example, the main body 10 is bent inward along a line which is perpendicular to a long side of the flexible display screen 14 at a center of the long side, so that the flexible display screen 14 is used as an inner side of the smart wristband. Alternatively, the main body 10 is bent outward along the line which is perpendicular to the long side of the flexible display screen 14 at the center of the long side, so that the flexible display screen 14 is used as a display screen of the smart wristband. The specific manner is not specifically limited in the present disclosure.

In the embodiment of the present disclosure, the main body 10 may implement different functions by changing a form. By still taking the above example, the different functions may be for example a function of an smart mobile phone, a function of an smart wristband or the like. When the form is changed, the color changing film 11 may present a different visual effect according to the deformation. Then, the user may judge which operation mode the main body 10 is currently being according to the visual effect of the color changing film 11. For example, when the main body is in a plate form, i.e., the main body does not deform, the color changing film 11 has a color of yellow, and when the main body 10 is bent to deform, the color changing film 11 has a color changed to blue. Obviously, the electronic device according to the present disclosure has a function of well prompting the user of the operation mode in which the electronic device is currently being.

Figure 5A:
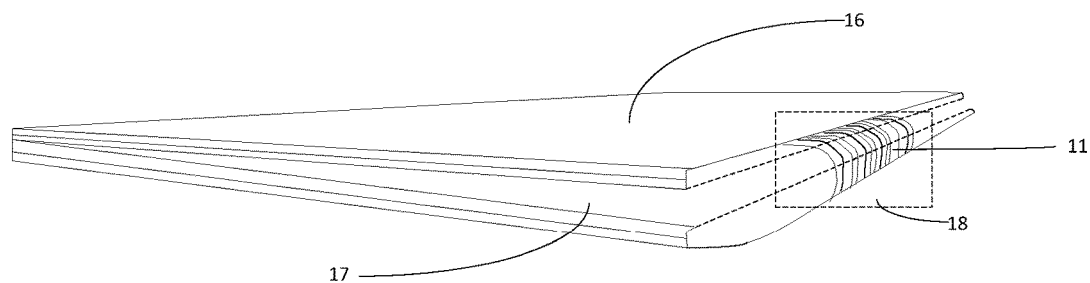
FIGS. 5A and 5B are diagrams of a second electronic device according to an embodiment of the present disclosure.

Alternatively, as shown in FIG. 5A, in the embodiment of the present disclosure, the main body 10 further comprises:
a first portion 16;
a second portion 17;
a connecting member 18, wherein the first portion 16 is connected to the second portion 17 through the connecting member 18, and a form conversion of the first portion 16 and the second portion 17 is achieved through the connecting member 18;
wherein the part of the surface of the appearance which is formed by attaching the color changing film 11 to the main body 10 is the connecting member 18 which covers the main body 10.

In the embodiment of the present disclosure, by taking the electronic device being a notebook computer as an example, the first portion 16 for example is a portion having a display screen, the second portion 17 correspondingly is a portion having a keyboard, and the connecting member 18 is a rotational apparatus of the notebook computer for connecting the two portions. In this case, a basic form of the notebook computer is a closed form, and a deformed form of the notebook computer is a form when the notebook computer is in a usage mode, a presentation mode, a tent mode or the like, which is not limited in the present disclosure.

In the embodiment of the present disclosure, the color changing film 11 may be enclosed on the connecting member 18. Thereby, the connecting member 18 which is not convenient to be embellished relative to other portions of the notebook computer is enclosed as a whole, which largely improves the visual experience of the notebook computer.

Figure 5B:
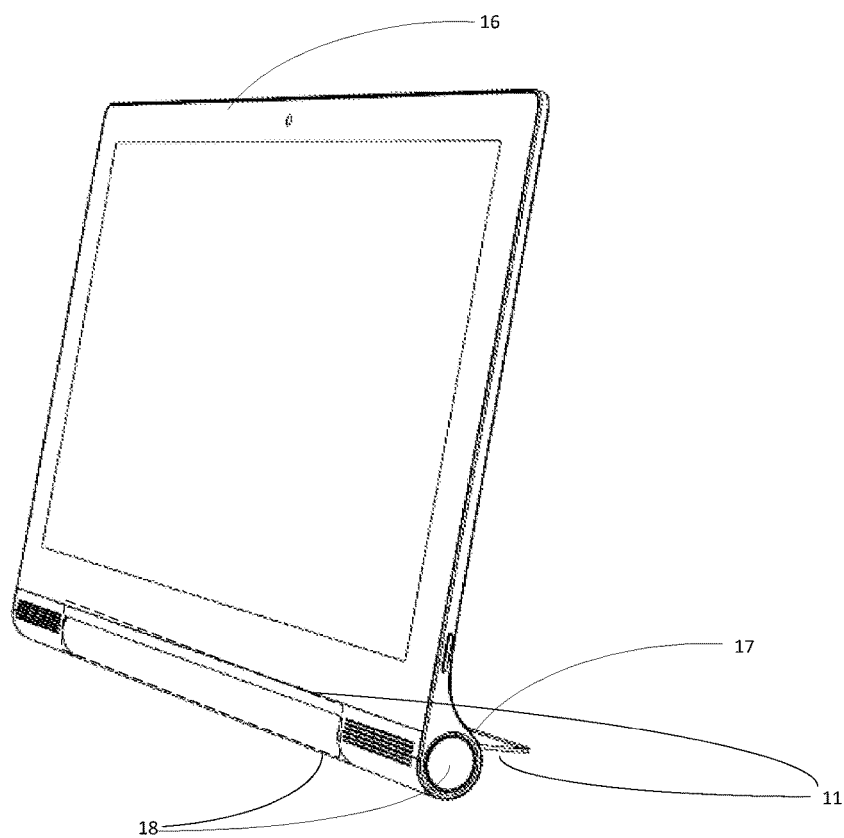

Alternatively, as shown in FIG. 5B, in the embodiment of the present disclosure, the first portion 16 may comprise a display screen, a processing unit or the like, and the second portion 17 is a support of the electronic device, which is disposed on the connecting member 18. The connecting member 18 is disposed on one side of the first portion 16. When the electronic device is in a basic form, the support may be rotated to be in a plane where the first portion is located. In this way, the user will not perceive the support, thereby improving the user experience. The color changing film 11 is enclosed on a surface of the support, and is also enclosed on a part of a region of the first portion 16, so that the color changing film 11 conceals a gap between the support and the first portion 16, so as to achieve a better visual effect of the whole electronic device. When the support is pulled away from the plane where the first portion is located, the color changing film 11 is stretched to deform, to achieve a different visual effect.

Figure 6A:
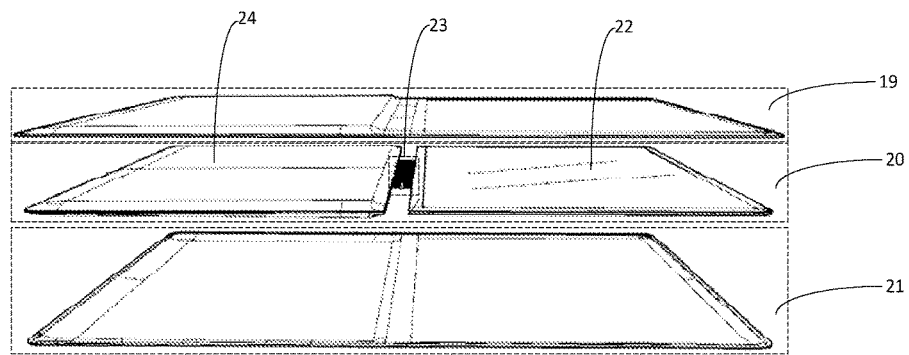
FIGS. 6A and 6B are diagrams of a third electronic device according to an embodiment of the present disclosure.

Alternatively, as shown in FIG. 6A, in the embodiment of the present disclosure, the main body 10 further comprises:
a first housing layer 19;
a frame component arrangement layer 20; and
a second housing layer 21, wherein the frame component arrangement layer 20 is encapsulated by the first housing layer 19 and the second housing layer 21, and is located in an interior encapsulation space formed by the first housing layer 19 and the second housing layer 21.

Still as shown in FIG. 6A, the frame component arrangement layer 20 comprises:
a first frame 22;
a rotational connecting member 23; and
a second frame 24 rotationally connected to the first frame 22 through the rotational connecting member 23;
wherein form deformation of the first frame 22 and second frame 24 is achieved through the rotational connecting member 23 under the action of an external force.

In the embodiment of the present disclosure, the first housing layer 19 comprises two portions, for example, an opening for arranging a display screen and an opening for arranging a keyboard. The frame component arrangement layer 20 comprises multiple functional components of the electronic device, for example, a processor, a main board, a graphics card or the like. The second housing layer 21 may be a casing of the electronic device for enclosing related components of the frame component arrangement layer 20 together with the first housing layer 19. The first housing layer 19 and the second housing layer 21 are fixed by using an encapsulation technology.

Figure 6B:
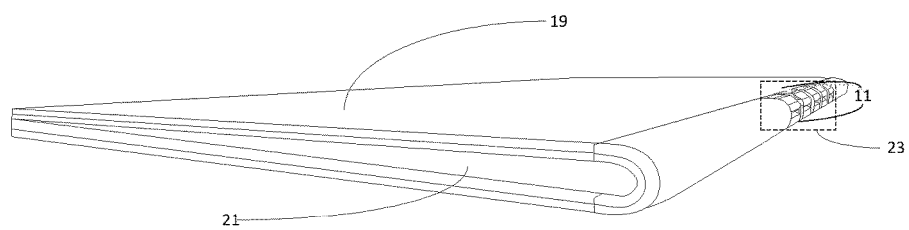

Alternatively, as shown in FIG. 6B, in the embodiment of the present disclosure, the rotational connecting member 23 may be in a visual form, i.e., an opening is disposed in the second housing layer 21 to expose the rotational connecting member 23, and then the color changing film 11 is enclosed on the exposed rotational connecting member 23. When the rotational connecting member 23 is rotated, the color changing film is deformed therewith, so as to change the visual effect thereof and present a different color. Of course, the rotational connecting member 23 may also be directly encapsulated in the first housing layer 19 and the second housing layer 21. In this case, the color changing film may be disposed on an appearance of the second housing layer 21. This may be set by those skilled in the art according to practical conditions, and is not limited in the present disclosure.

Figure 7:
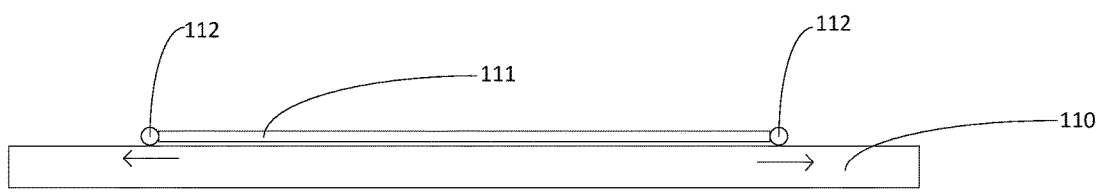
FIG. 7 is a structural block diagram of another electronic device according to an embodiment of the present disclosure.

In the embodiment of the present disclosure, as shown in FIG. 7, based on the same inventive concept, an electronic device is further provided, which specifically comprises:

a main body 110;

a color changing film 111 attached to the main body 110 to form a surface of an appearance of the main body 110, the color changing film 111 having a basic form and a deformed form; and a stretching apparatus 112 configured to actuate a change from the basic form to the deformed form; wherein, if the color changing film 111 as the appearance of the main body 110 is in the basic form, the color changing film 111 presents a first visual effect; and if the color changing film 111 as the appearance of the main body 110 is in the deformed form, the color changing film 111 presents a second visual effect different from the first visual effect.

In the embodiment of the present disclosure, the main body 110 may be a flexible supporting housing of a tablet computer, an electronic device having a flexible display screen or the like, for example, a flexible housing on a back side of a mobile phone having a flexible screen. Alternatively, the main body 110 may also be a band for wearing an electronic device such as an smart wrist-mounted device, for example, a watchband of an smart watch, or a fixing band of an smart wristband. The main body 110 may also be a notebook computer, or an smart tablet phone or the like, which is not limited in the present disclosure.

In the embodiment of the present disclosure, the basic form is a form when the color changing film 111 does not deform, for example, a form when the color changing film 111 is not stretched, and the corresponding deformed form is for example a form when the color changing film 111 is stretched by an external force.

In the embodiment of the present disclosure, the color changing film 111 may be used as the whole appearance of the main body 110. For example, the whole appearance of the flexible supporting housing of the flexible electronic device is set as the color changing film 111. Alternatively, the color changing film 111 may be used as a part of the appearance of the main body 110, for example, an appearance of a rotational connecting member of a notebook computer or the like, which is not limited in the present disclosure.

In the embodiment of the present disclosure, both ends of the color changing film 111 may be controlled by the stretching apparatus 112 to deform together, or one end of the color changing film 111 is fixed, and the other end of the color changing film 111 is connected to the stretching apparatus 112, which is not specifically limited in the present disclosure. The stretching apparatus 112 has a function of actuating the color changing film 111 to deform, for example, stretching the color changing film 111. The stretching apparatus 112 may be controlled by the electronic device. Thus, the electronic device may control the color changing film 111 to present a particular visual effect through the stretching apparatus 112 according to users' requirements, which largely improves the user experience.

The above one or more technical solutions according to the embodiments of the present disclosure at least have the following one or more technical effects and advantages:

In the embodiment of the present disclosure, the technical measure of attaching the color changing film to a part of an external surface of the main body 10 is used, so that when the main body 110 is in a different form, the color changing film 111 may deform therewith, so as to present a different visual effect, which largely improves the user experience.

In the embodiment of the present disclosure, when the main body 110 is in different forms, the color changing film 111 may have different colors. Therefore, the user can determine the state of the electronic device only through the color of the color changing film 111, which can effectively prompt the user of the current operation state of the electronic device while improving the visual experience of the electronic device.

Although preferable embodiments of the present disclosure have been described, additional changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

I claim:

1. An electronic device, comprising:
   a main body having a basic form and a deformed form; and
   a color changing film attached to the main body to form a part of a surface of an appearance, wherein under an action of an external force, a spacing between particles in the color changing film is deformed as the main body is changed from the basic form to the deformed form, and wherein if the main body is in the basic form, the color changing film, as the part of the appearance of the main body, presents a first visual effect, and if the main body is in the deformed form, the color changing film, as the part of the appearance of the main body, presents a second visual effect different from the first visual effect;

the color changing film is comprised of M sub-films, wherein M is a positive integer greater than or equal to 2;

if the main body is in the basic form, each of the M sub-films, as the part of the appearance of the main body, has a first color, at least a first sub-film of the M sub-films has a first color which is different from a first color of a second sub-film, and the first visual effect is comprised of the first color of each of the M sub-films; and if the main body is in the deformed form, each of the M sub-films, as the part of the appearance of the main body, has a second color, at least the first sub-film of the M sub-films has a second color which is different from a second color of the second sub-film of the M sub-films, and the second visual effect is comprised of the second color of each of the M sub-films.

2. The electronic device according to claim 1, wherein the color changing film is deformed as the main body is changed from the basic form to the deformed form, so that the color changing film is converted from the first visual effect to the second visual effect.

3. The electronic device according to claim 2, wherein the color changing film is a one-piece film;

if the main body is in the basic form, the one-piece film, as the part of the appearance of the main body, has a first color, and the first visual effect is the first color; and if the main body is in the deformed form, the one-piece film, as the part of the appearance of the main body, has a second color, and the second visual effect is the second color.

4. The electronic device according to claim 3, wherein the color changing film is comprised of nanocrystals, and;

in the process of the color changing film being deformed as the main body is changed from the basic form to the deformed form, a spacing between the nanocrystals is changed to achieve a visual effect of a change in color of the color changing film.

5. The electronic device according to claim 4, wherein the color changing film is a deformable colloid film.

6. The electronic device according to claim 4, wherein the color changing film has a thickness within [0.1 mm, 0.5 mm].

7. The electronic device according to claim 1, wherein the main body further comprises:

a flexible supporting housing having an accommodating cavity formed therein and having an opening disposed therein;

a flexible display screen disposed in the accommodating cavity and having a display output region exposed through the opening; and a flexible circuit board disposed in the accommodating cavity and located between the flexible display screen and the flexible supporting housing, wherein the flexible supporting housing, the flexible display screen, and the flexible circuit board are flexibly deformed together under the action of an external force;

wherein the part of the surface of the appearance which is formed by attaching the color changing film to the main body is the whole appearance of the flexible supporting housing, or the part of the surface of the appearance which is formed by attaching the color changing film to the main body is the flexible supporting housing, and the flexible supporting housing is made of the color changing film.

8. The electronic device according to claim 1, wherein the main body further comprises:

a first portion;

a second portion;

a connecting member, wherein the first portion is connected to the second portion through the connecting member, and a form conversion of the first portion and the second portion is achieved through the connecting member;

wherein the part of the surface of the appearance which is formed by attaching the color changing film to the main body is the connecting member which covers the main body.

9. The electronic device according to claim 1, wherein the main body further comprises:

a first housing layer;

a frame component arrangement layer; and a second housing layer, wherein the frame component arrangement layer is encapsulated by the first housing layer and the second housing layer and is located in an interior encapsulation space formed by the first housing layer and the second housing layer, wherein, the frame component arrangement layer comprises:

a first frame;

a rotational connecting member; and a second frame rotationally connected to the first frame through the rotational connecting member, wherein a form deformation of the first frame and the second frame is achieved through the rotational connecting member under the action of an external force.

* * * * *